(12) United States Patent
Bendel

(10) Patent No.: US 10,975,600 B2
(45) Date of Patent: Apr. 13, 2021

(54) MOTOR VEHICLE LOCK

(71) Applicant: Kiekert AG, Heiligenhaus (DE)

(72) Inventor: Thorsten Bendel, Oberhausen (DE)

(73) Assignee: Kiekert AG, Heiligenhaus (DE)

( * ) Notice: Subject to any disclaimer, the term of this patent is extended or adjusted under 35 U.S.C. 154(b) by 690 days.

(21) Appl. No.: 15/562,057

(22) PCT Filed: Mar. 22, 2016

(86) PCT No.: PCT/DE2016/100133
§ 371 (c)(1),
(2) Date: Sep. 27, 2017

(87) PCT Pub. No.: WO2016/155699
PCT Pub. Date: Oct. 6, 2016

(65) Prior Publication Data
US 2018/0106081 A1    Apr. 19, 2018

(30) Foreign Application Priority Data

Mar. 27, 2015  (DE) ..................... 10 2015 003 918.0

(51) Int. Cl.
*E05B 81/14* (2014.01)
*E05B 81/20* (2014.01)
(Continued)

(52) U.S. Cl.
CPC .............. *E05B 81/14* (2013.01); *E05B 81/13* (2013.01); *E05B 81/20* (2013.01); *B60J 1/08* (2013.01);
(Continued)

(58) Field of Classification Search
CPC ............. Y10T 292/1082; Y10T 292/65; Y10T 292/67; Y10T 292/11; Y10S 292/14;
(Continued)

(56) References Cited

U.S. PATENT DOCUMENTS

| 1,447,846 | A | * | 3/1923 | Hill ......................... E05O 19/08 |
| | | | | 292/283 |
| 2,199,369 | A | * | 4/1940 | Bernstein ................ E05C 17/36 |
| | | | | 292/288 |

(Continued)

FOREIGN PATENT DOCUMENTS

| DE | 19616655 A1 | 10/1997 |
| DE | 19700887 A1 | 7/1998 |

(Continued)

OTHER PUBLICATIONS

English Translation of First Chinese Office Action dated Nov. 27, 2018 for related Chinese Application No. 201680018493.9.

(Continued)

*Primary Examiner* — Kristina R Fulton
*Assistant Examiner* — Faria F Ahmad
(74) *Attorney, Agent, or Firm* — Renner, Otto, Boisselle & Sklar, LLP

(57) ABSTRACT

The invention relates to a motor vehicle lock comprising a locking mechanism provided with a rotary latch and at least one pawl, a rotary movement of the rotary latch can be blocked by means of the pawl, a drive device by means of which the pawl can be transferred from the locked position into a release position for the locking mechanism, and an adjusting device (9). A motor vehicle part (4) accommodating the vehicle lock can be moved from the closed position into an open position by means of the adjusting device (9). Said adjusting device (9) maintains the motor vehicle part (4) in the open position such that the motor vehicle part (4) can be prevented from opening automatically from the open position.

15 Claims, 3 Drawing Sheets

Figure 1:
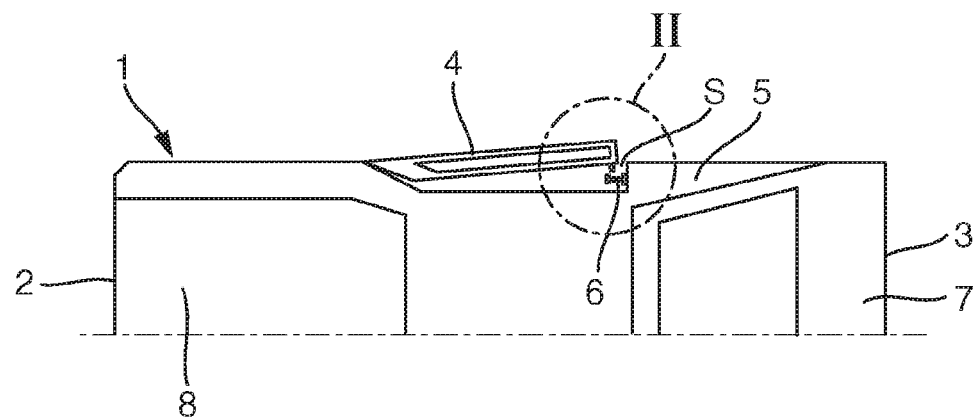

(51) Int. Cl.
| | |
|---|---|
| *E05B 81/12* | (2014.01) |
| *E05C 17/02* | (2006.01) |
| *E05C 17/46* | (2006.01) |
| *E05F 15/611* | (2015.01) |
| *E05C 17/16* | (2006.01) |
| *E05C 17/12* | (2006.01) |
| *E05C 17/50* | (2006.01) |
| *E05C 17/00* | (2006.01) |
| *E05C 17/04* | (2006.01) |
| *B60J 1/08* | (2006.01) |
| *B60J 5/04* | (2006.01) |

(52) U.S. Cl.
CPC .............. *B60J 5/047* (2013.01); *E05C 17/00* (2013.01); *E05C 17/02* (2013.01); *E05C 17/04* (2013.01); *E05C 17/045* (2013.01); *E05C 17/047* (2013.01); *E05C 17/12* (2013.01); *E05C 17/16* (2013.01); *E05C 17/46* (2013.01); *E05C 17/50* (2013.01); *E05F 15/611* (2015.01); *Y10S 292/14* (2013.01); *Y10S 292/15* (2013.01); *Y10T 292/1082* (2015.04); *Y10T 292/11* (2015.04); *Y10T 292/65* (2015.04); *Y10T 292/67* (2015.04)

(58) Field of Classification Search
CPC ........ Y10S 292/15; E05C 17/00; E05C 17/02; E05C 17/04; E05C 17/042; E05C 17/045; E05C 17/047; E05C 17/12; E05C 17/16; E05C 17/46; E05C 17/50; E05B 81/14; E05B 81/13; E05B 81/20; E05F 15/611; B60J 1/08; B60J 5/047; B60R 13/043
See application file for complete search history.

(56) References Cited

U.S. PATENT DOCUMENTS

| | | | | |
|---|---|---|---|---|
| 2,227,144 A * | 12/1940 | Krause | ..................... | E05B 83/24 292/1 |
| 2,618,497 A * | 11/1952 | Gardels | ................. | E05C 17/042 292/265 |
| 2,683,447 A * | 7/1954 | Pollock | ................. | F24C 15/023 126/191 |
| 2,742,312 A * | 4/1956 | Oswald | ................... | E05C 17/14 292/241 |
| 2,857,617 A * | 10/1958 | Loria | ...................... | E05C 17/16 16/85 |
| 3,003,800 A * | 10/1961 | Hammond | .............. | E05B 83/24 292/11 |
| 3,964,125 A * | 6/1976 | Tansley | .................... | A62C 2/06 16/48.5 |
| 4,070,050 A * | 1/1978 | Glock | ................... | E05C 17/042 292/339 |
| 4,098,530 A * | 7/1978 | Edeus | ................. | E05B 65/0817 292/113 |
| 4,159,837 A * | 7/1979 | Morita | ................... | E05C 17/50 16/85 |
| 4,322,103 A * | 3/1982 | Acton | ................... | E05C 17/047 292/262 |
| 4,393,754 A * | 7/1983 | Hough | ....................... | B60J 7/22 296/217 |
| 4,593,946 A * | 6/1986 | Rich | ................... | B05B 13/0292 292/262 |
| 4,609,216 A * | 9/1986 | Baker | ................... | B60J 5/0487 292/262 |
| 4,667,993 A * | 5/1987 | Hannesson | ........... | E05C 17/042 24/298 |
| 4,756,562 A | 7/1988 | Foster et al. | | |
| 4,848,031 A | 7/1989 | Yamagishi | | |
| 5,141,266 A * | 8/1992 | Braun | ................. | E05B 65/0811 292/216 |
| 5,163,724 A * | 11/1992 | Conte | ................... | E05C 17/042 269/249 |
| 5,165,742 A * | 11/1992 | Frayne | ................. | E05C 17/042 292/262 |
| 5,551,738 A * | 9/1996 | Thorlton | ............... | E05C 17/042 24/598.6 |
| 5,862,570 A * | 1/1999 | Lezuch | ................. | E05C 17/085 16/82 |
| 6,048,005 A * | 4/2000 | Rotondi | ................ | E05C 17/042 292/262 |
| 6,253,417 B1 * | 7/2001 | Rusiana | .................. | E05C 17/28 16/65 |
| 6,360,407 B1 * | 3/2002 | Webster | .............. | B05B 13/0292 24/455 |
| 6,543,822 B1 * | 4/2003 | King | ....................... | E05B 83/24 292/214 |
| 6,547,291 B1 * | 4/2003 | Schwaiger | .............. | E05B 83/16 292/109 |
| 6,656,278 B2 * | 12/2003 | Baisch | ................ | B05B 13/0292 118/500 |
| 7,172,224 B2 * | 2/2007 | Carter | ................... | E05C 17/042 292/262 |
| 7,770,959 B2 * | 8/2010 | Browne | ................ | E05C 17/203 296/146.12 |
| 7,988,210 B2 * | 8/2011 | Shibata | ................. | E05B 85/045 292/340 |
| 8,117,717 B2 * | 2/2012 | Perche | ................. | E05D 11/0009 16/82 |
| 8,127,401 B2 * | 3/2012 | Folk | ................... | E05D 11/1014 16/374 |
| 8,231,152 B2 * | 7/2012 | Carlson | ................ | E05C 17/042 292/262 |
| 8,915,524 B2 * | 12/2014 | Charnesky | ............. | E05B 79/20 292/216 |
| 9,085,252 B2 * | 7/2015 | Gholap | ................ | B60N 2/2245 |
| 9,322,204 B2 * | 4/2016 | Suzuki | .................... | E05B 81/36 |
| 10,458,171 B2 * | 10/2019 | Khan | ..................... | E05F 15/611 |
| 2003/0057711 A1 * | 3/2003 | Laporta | ................ | E05C 17/025 292/8 |
| 2003/0122382 A1 | 7/2003 | Baniak et al. | | |
| 2005/0127711 A1 * | 6/2005 | Rigorth | ................ | E05F 15/63 296/146.4 |
| 2006/0214435 A1 * | 9/2006 | Swink | ..................... | E05C 17/50 292/262 |
| 2007/0063536 A1 * | 3/2007 | Okada | ................. | E05F 15/619 296/146.4 |
| 2009/0051192 A1 * | 2/2009 | Ewing | ................... | E05F 15/622 296/146.2 |
| 2011/0266080 A1 * | 11/2011 | Schmitt | ................. | E05C 17/006 180/89.1 |

FOREIGN PATENT DOCUMENTS

| | | |
|---|---|---|
| DE | 298 12 121 U1 | 11/1999 |
| DE | 200 16 292 U1 | 12/2000 |
| DE | 19944554 A1 | 3/2001 |
| DE | 101 11 240 A1 | 1/2003 |
| DE | 10 2011 015 669 A1 | 10/2012 |
| EP | 0 310 993 A2 | 4/1989 |
| JP | H02101278 A | 4/1990 |
| JP | 2011106187 A | 6/2011 |
| JP | 2014101687 A | 6/2014 |

OTHER PUBLICATIONS

English Translation of Second Chinese Office Action dated Jun. 17, 2019 for related Chinese Application No. 201680018493.9.
English Translation of Third Chinese Office Action dated Dec. 10, 2019 for related Chinese Application No. 201680018493.9.
International Search Report and Written Opinion for corresponding Patent Application No. PCT/DE2016/100133 dated Sep. 1, 2016.

* cited by examiner

MOTOR VEHICLE LOCK

The invention relates to a motor vehicle latch having a locking mechanism with a catch and at least a pawl, whereby by means of the pawl a rotational movement of the catch can be blocked, a drive device with which the pawl can be transferred from a blocking position into a releasing position for the locking mechanism and a swing-out device, whereby a motor vehicle component incorporating the motor vehicle latch can be moved out of a closure position into an opening position by means of the swing-out device.

The operation of a motor vehicle is increasingly simplified by electronic and electrical aids. Thus, bolting and unbolting using remote control has meanwhile become the rule rather than the exception. It is also known that in addition to the bolting and unbolting of a motor vehicle latch, electrical opening of the closure mechanism, preferably of a locking mechanism, can also be executed. If the locking mechanism is opened, for example, a motor vehicle door can thus be opened without the manual activation of an external activation handle.

From DE 298 12 121 U1 a tailgate latch is known, which in addition to an electrical opening mechanism also includes a lifting instrument with which the tailgate can be transferred into an opening position. The latch includes an electrical drive which acts on a lever chain by means of which the locking mechanism can be unlocked. If the locking mechanism is unlocked and releases the latch holder, the tailgate can thus be opened. In addition to electrical opening, the latch mechanism encompasses a lifting instrument, whereby the tailgate can be transferred into an opening position using the lifting instrument. The opening position enables the operator to easily reach a handle or the tailgate himself in order to completely open it.

From DE 10 2011 015 669 A 1 a swing-out device for motor vehicle doors or flaps is known with which a door, flap or hood can be transferred from a closure position into an opening position. If the swing-out device relates, for example, to a motor vehicle lateral door, the door can thus be opened by means of an electrical impulse, for example. For this purpose, the locking mechanism of the door latch must preferably be electrically unlocked initially so that the door can be opened. If the door sealing pressure is now insufficient, for example, to transfer the door from the closure position to an opening position, the door can be transferred into an opening position by means of the swing-out device. An opening position is hereby defined in that the operator of the motor vehicle is able to reach the door in such a way that he can open the door completely. An electrical drive which acts on the motor vehicle door by means of a drive pawl and an internal and external lever mechanically in the form of a pivoting movement of the lever hereby serves as a swing-out device.

A swing-out device integrated directly into a motor vehicle door latch has become known from DE 200 16 292 U1. The latch consisting of a pawl and a catch has a pawl drive with which the pawl can be disengaged from the catch. After electrical activation, the pawl drive moves the pawl out of the engagement area of the catch and thus releases the latch holder, whereby the flap, hood or door can be opened. The pawl drive now moves further and by means of a connection lever between the pawl and the catch pulls the catch into a position in which the latch holder is not only released, but the catch braces on the latch holder and lifts or moves the motor vehicle component, such as the hood, flap or door, into an opening position. A gap is thus created between the motor vehicle component and the motor vehicle chassis, whereby the gap increases user-friendliness.

A problem occurring with the known swing-out device is that after opening of the locking mechanism and movement of the door, flap or hood this motor vehicle component moves into an undefinable position. According to the position or alignment of the motor vehicle, it can occur that a motor vehicle door is moved into a more or less large opening position, for example. This undefinable state is not desired and can also lead to impediments or damage to the vehicle.

The task of the invention is to provide an improved motor vehicle latch. Another task of the invention is to create an option to bring the motor vehicle component into a defined position in order to prevent damage or misoperation. Another task of the invention is to provide a cost-effective solution of simple construction.

The task is solved according to the invention by the characteristics of the independent claims. Advantageous designs of the invention are specified in the sub-claims. It is pointed out that the exemplary embodiments described hereafter are not restrictive; instead, any variations are possible of the characteristics described in the description and the sub-claims.

According to patent claim 1, the task of the invention is solved by a motor vehicle latch being provided, having a locking mechanism with a catch and at least a pawl, whereby by means of the pawl a rotational movement of the catch can be blocked, a drive device with which the pawl can be transferred from a blocking position into a releasing position for the locking mechanism and a swing-out device, whereby a motor vehicle component incorporating the motor vehicle latch can be moved out of a closure position into an opening position by means of the swing-out device and whereby the swing-out device holds the motor vehicle component in its opening position, so that independent opening of the motor vehicle component beyond the opening position can be prevented. By means of the formation of the swing-out device according to the invention, the possibility is now created of preventing unintended opening of the motor vehicle component. The swing-out device holds the motor vehicle component in its opened position so that complete independent opening of the motor vehicle component is safely prevented. In particular, the opening position enables the operator to reach the door and open it conveniently. The opening position can vary according to the motor vehicle component. However, the opening position is preferably the position in which reaching into a gap formed by the opening position is enabled. The motor vehicle component, which can, for example, be a door, a flap, a motor hood, a sliding door or, for example, a glovebox, can be immobilized or held by the swing-out device in the opening position.

The invention relates to a motor vehicle latch, whereby hereby a motor vehicle door latch is not claimed exclusively, but latches can also be meant which act as motor hood latches, tailgate latches, sliding door latches, tank latches or flap latches, and all of those motor vehicle components which have an automatic opening device and need to be protected from complete opening. The invention preferably relates to motor vehicle door latches with a locking mechanism, having a catch and at least a pawl.

The catch is preferably rotatably accommodated in the motor vehicle latch and interacts with a latch holder or a latch bracket. If the interplay between the latch holder and the catch for example causes a rotational movement of the catch in the closure direction, the pawl thus acts in a spring-loaded manner, for example, with the catch, so that the catch is immobilized or held in its closure position. The pawl blocks the rotational movement of the catch.

A drive device which is preferably electrically activated acts on the pawl and can transfer the pawl from its blocked position into a release position so that the catch becomes free and opens the locking mechanism. Such motor vehicle latches are also described as electrical latches or E-latches and the unblocking process is described as electrical opening. In particular in the case of E-latches, in which the locking mechanism is electrically released, for example, a door sealing pressure can, for example, cause the motor vehicle component to be transferred from a closure position into an opening position.

If the door sealing pressure is now insufficient in order to move the motor vehicle door from the closure position into an opening position, so that an operator can reach the door and completely open it, the swing-out device thus serves to transfer the motor vehicle door into an opening position. If the motor vehicle, for example, is at an unfavorable angle, for example, on an inclined street, it can thus occur that the operator electrically opens the E-latch and that the motor vehicle door opens independently from the closure position into a position far beyond the opening position. This can lead to impediments, damage to the door or injuries in the worst case scenario. The swing-out device according to the invention with a holding function hereby enables the motor vehicle door or the motor vehicle component to be positioned or held in the opening position.

In an alternative embodiment of the invention the swing-out device is at least partly integrated into the motor vehicle latch. If the swing-out device is part of the motor vehicle latch, on the one hand construction space can thus be saved and the installation of the swing-out device is also simplified. As part of the motor vehicle latch, recourse can also be had to the electrical or electronic components of the motor vehicle, so that the swing-out device also requires no separate electricity supply. Also, the swing-out device could be arranged in the motor vehicle latch in such a way that no additional openings need to be inserted into the motor vehicle door or that available openings only need to be slightly modified in order to integrate a swing-out device according to the invention into a motor vehicle.

If the drive device forms a drive for the swing-out device, a further embodiment of the invention thus results. An electromotor which, for example, acts with a gearbox on an actuator device preferably serves as a drive device for electrical opening of the motor vehicle latch so that the pawl can be detached from the catch. If the electromotor present in the motor vehicle latch is now used as a drive device for the swing-out device, a further drive for the swing-out device can thus be dispensed with. This reduces constructional space, costs and components so that a range of advantages result from a drive device encompassing several functions.

In a further execution form, the swing-out device can have a swing-out tool, whereby by means of the swing-out tool the motor vehicle component can be moved into the opening position. If a swing-out tool is used, components of the motor vehicle in the area of the motor vehicle latch can thus be acted on specifically. In particular, it is possible, for example, to move a separate swing-out tool in the motor vehicle latch which interacts with a further component of the motor vehicle interacting with the motor vehicle latch so that a relative force can be attained between the latch and the further component.

In one variant of the invention, for example, the swing-out tool can be formed from a plunger which can be moved out of the motor vehicle latch. For example, the plunger can have an interconnection by means of which the plunger can be driven and moved out of the latch. According to the field of use of the motor vehicle latch according to the invention, it is then possible to start a more or less large lift on the one hand by the drive of the swing-out tool and also over the length of the swing-out tool.

If the swing-out tool moves together with a latch holder, in particular a latch holder bolt or latch holder bracket, a further embodiment of the invention thus results. When the motor vehicle latch is used, the locking mechanism interacts in a lateral door, sliding door or flap mainly with a latch holder affixed on the motor vehicle. Movement of the locking mechanism in the direction of the latch holder causes the locking mechanism to be blocked. Naturally, a reverse movement is also conceivable and possible. If now due to a lack of door sealing pressure, the door does not move completely into an opening position, the swing-out device can thus act directly on the latch holder and move the door into an opening position with a plunger, for example. The actuating tool or toggle tool is arranged in direct proximity to the locking mechanism which, in turn, is advantageous in relation to the construction space.

A further embodiment results when the swing-out device interacts with a motor vehicle element, in particular a door seal. The swing-out device as a component of the motor vehicle latch in the closed state of the motor vehicle door, for example, is arranged in direct proximity to the door seal or is even directly adjacent to the door seal. Advantageously, a swing-out device can now act on the door seal and generate a relative force which moves the door into an opening position. The door is thus moved or pushed from the closure position into the opening position.

Advantageously, the swing-out device can interact with a further component of the motor vehicle and in particular a latch holder in a form-fitting and/or force-fitting manner. By the formation of suitable forms, the swing-out device can interact directly with the latch holder. If, for example, a latch holder bolt is in use, a form fit of the swing-out tool with an opening, for example, a depression in the latch holder bolt which serves for installation can interact in a form-fitting manner and engage into the opening, for example. An extremely cost-effective and safe holding of the motor vehicle door is hereby possible, for example.

It is also conceivable that the swing-out device grips the latch holder in a form-fitting manner, at least in places, so that on the one hand sufficient force can be exerted on the latch holder and that also a form fit is guaranteed in such a way that positioning, i.e. holding of the motor vehicle door in the opening position, is enabled.

According to the formation of the swing-out tool, however, a force-fitting connection between the swing-out tool and the latch holder is conceivable. If, for example, the swing-out device in one variant is coated with a material, such as plastic or rubber, for example, sufficient traction can be provided between the swing-out device and the latch holder in order to hold the door or flap in its opening position, whereby a frictional connection is preferably generated. However, a combination of frictional connection and form fit is also conceivable.

In a further embodiment of the invention, the swing-out tool interacts with the latch holder by means of magnetic force. If, for example, the swing-out tool is executed magnetically, a very easy holding of the motor vehicle component in the opening position is thus enabled. A multitude of components of a motor vehicle are ferromagnetic so that the swing-out tool is able to interact with the further components of the motor vehicle and to exert a magnetic holding force. The magnetic swing-out device means preferably interacts with the latch holder and can thus hold the, for example, motor vehicle door in the opening position. In this opening position, the operator can reach the door and detach the swing-out tool from the latch holder. For this purpose, only the magnetic force between the swing-out tool and the latch holder needs to be overcome. This gives the vehicle user the possibility of haptic response and thus the feeling of safety that the door is securely held in the opening position. Naturally, this also applies to a form- and or frictional-and/or force-fitting holding of the motor vehicle component.

If the motor vehicle component is a motor vehicle door, a preferred embodiment of the invention thus results, whereby the motor vehicle door can be brought into an opening position so far by means of the swing-out tool that an opening gap between the motor vehicle door and chassis can be reached into. In particular for a motor vehicle door, the use of a swing-out tool is suitable so that the motor vehicle door is preferably executed as an electrical door, i.e. as a door equipped with an E-latch, whereby such a door, for example, can also be executed without an external activation handle. This is advantageous in particular for aesthetic reasons and in the design of the motor vehicle.

If by means of the swing-out device according to the invention on the one hand a gap can be attained between the motor vehicle door and the further components of the motor vehicle and the door moved into an opening position, the operator can be certain on the one hand that the door does not open independently and on the other hand there is also the possibility by means of the swing-out tool or the swing-out device of moving the door back again into a closure position, at least in places. Hereby automatic opening and closure at least in the area between a closure position of the door and an opening position of the door is enabled. By means of the swing-out tool or the swing-out device the motor vehicle door can then be moved back from an opening position into a closure position and at least so far into a closure position that automatic closure by means of the locking mechanism is enabled, for example.

The invention is described in further detail below with reference to the attached drawings on the basis of the preferred execution forms. However, the principle applies that the exemplary embodiment does not restrict the invention but only constitutes an advantageous execution form. The characteristics depicted can be executed individually or in combination, individually or in combination with other characteristics of the description, as also the patent claims.

Figure 2:
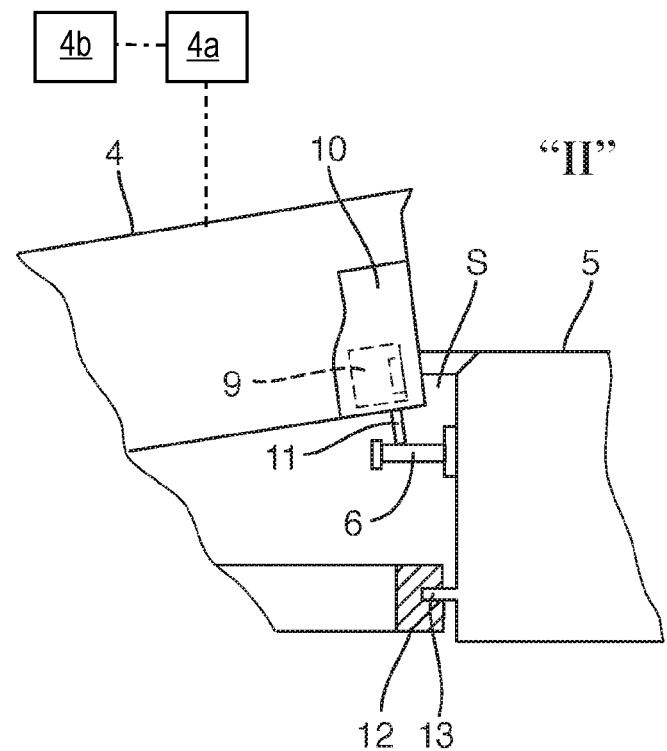
Figure 3:
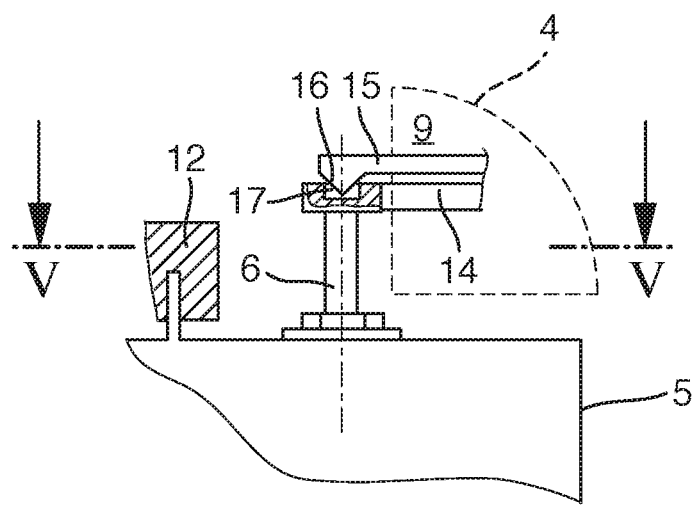
Figure 4:
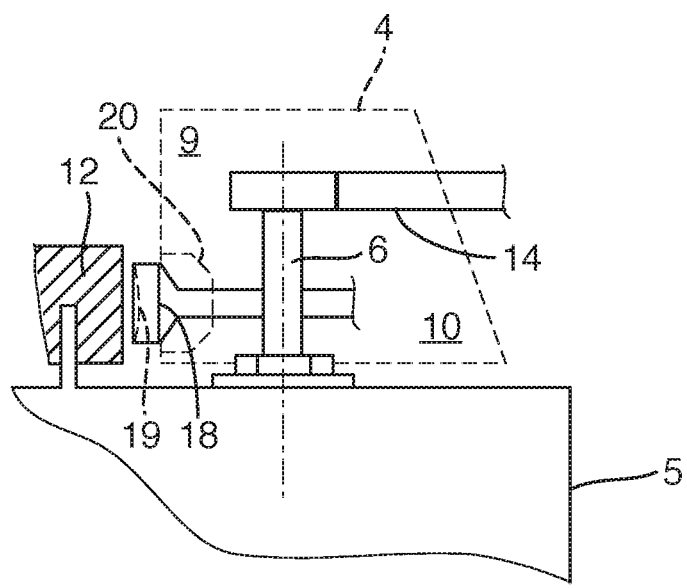
Figure 5:
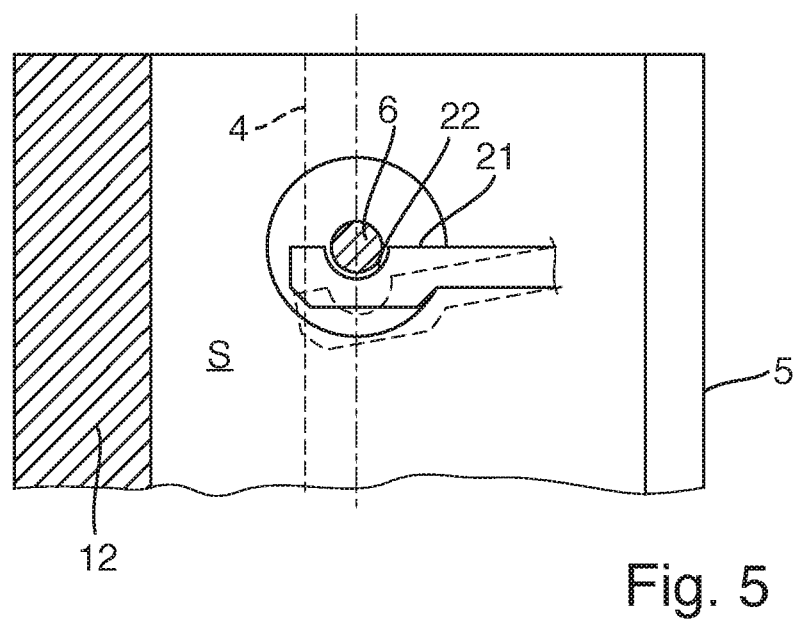

The following are shown:

FIG. 1 a top view on a motor vehicle with a lateral door situated in an opening position, FIG. 2 a detailed view of the lateral door situated in the opening position according to FIG. 1 and in particular view II, in a sectional view which shows the fundamental arrangement between a motor vehicle latch situated in the lateral door and the swing-out device which interacts with a latch holder, FIG. 3 again, an enlarged illustration of the cut according to FIG. 2 in the area of the latch holder which illustrates the interplay between the latch holders and the swing-out device in an exemplary embodiment, FIG. 4 also a sectional view according to FIG. 2 in the area of the latch holder with alternative execution forms of swing-out devices and FIG. 5 a view of a latch holder according to line V-V from FIG. 3 with a further alternative embodiment of a swing-out tool.

In FIG. 1, a top view is illustrated on a motor vehicle 1 illustrated in principle. The motor vehicle 1 has a front area 2, a tailgate area 3 and a lateral door 4. The motor vehicle lateral door 4 is reproduced in an opening position, whereby the opening position is distinguished by an opening gap S between the motor vehicle chassis 5 and the lateral door 4. A latch holder 6 is apparent in the area of the opening gap S which is executed as a locking bolt in this exemplary embodiment. Even if in this exemplary embodiment the swing-out device according to the invention is reproduced using the example of a motor vehicle door 4, this is thus not restrictive. Instead, it is conceivable to use the swing-out device also, for example, for a tailgate 7 situated in the motor vehicle tailgate 3 or, for example, for a motor hood 8 situated in the area of the motor vehicle front.

In FIG. 2 an enlarged view of detail II from FIG. 1 is illustrated in the area of the latch holder 6. The same components are furnished with the same reference figures in the Figures. For better clarification of the arrangement of the swing-out device 9 the detail view II is reproduced in a cut through the motor vehicle 1 above the latch holder 6. The swing-out device 9 is integrated into a motor vehicle door latch 10 and has a swing-out tool 11 which interacts directly with the latch holder 6. The swing-out tool 11 is movable in the swing-out device in this exemplary embodiment in such a way that the swing-out tool 11 can be moved out of the motor vehicle door 4. A door seal 12 is affixed on folded edges 13 of the motor vehicle chassis 5. The door seal 12 encompasses the motor vehicle door, preferably entirely, and seals the interior of the motor vehicle 1 against the environment.

In addition to this sealing function, the door seal 12 generates a force on the motor vehicle door 4 and in particular if the motor vehicle door is situated in the completely closed closure position. This door sealing force can be used by the motor vehicle door latch 10 in order to open the locking mechanism 4a by only the pawl being removed from the catch and the door sealing force or the door sealing pressure causing a rotational movement of the catch, i.e. opening of the locking mechanism 4a. The swing-out device 9 moves the motor vehicle door 4 completely into the motor vehicle door 4 in the opening position after the locking mechanism 4a is electrically unlocked initially by the drive 4b so that the door 4 can be opened.

In FIG. 3, a further detailed illustration is reproduced in the area of the latch holder 6 and the door seal 12. The latch holder 6 is screwed as a locking bolt with the motor vehicle chassis 5. A first swing-out tool 11 in the form of a plunger 14 which acts directly on the locking bolt 6 is illustrated. For example, the plunger 14 can be executed magnetically and, contrary to the illustrated exemplary embodiment, also interact with the locking bolt 6 without the swing-out tool 15 engaging into the locking bolt 6 in a form-fitting manner. A combination of a plunger 14 and a swing-out tool 15 engaging into the locking bolt 6 in a form-fitting manner is illustrated. The swing-out tool 15 which is formed in a form-fitting manner has a conical tip 16 which engages into a key opening 17 of the locking bolt 6. The swing-out tool 15 engaging into the locking bolt 6 in a form-fitting manner can consist of a sprung material, such as plastic or spring steel and/or be adjacent in the key opening 17 in a sprung manner. In any case, the form-fitting swing-out tool 15 exerts sufficient force on the locking bolt 6 in order to hold the motor vehicle lateral door 4 in the opening position. Both swing-out tools 14, 15 illustrated in FIG. 3 can be extended from the motor vehicle lateral door 4 at least in part.

FIG. 4 shows a further exemplary embodiment of a swing-out device 9 in the area of the latch holder 6. A swing-out tool 11 formed as a plunger 16 in turn acts on the locking bolt 6, whereby the plunger 16 does not move out of the motor vehicle door 4. Alternatively or additionally, a further swing-out tool 18 can be provided for which can be moved out of the motor vehicle door 4 and acts against the door seal 12. The swing-out tool 18 can also be executed as a suction cup 19, for example. In order that the swing-out tool 18 can be incorporated flush in the motor vehicle door 4, the motor vehicle door 4 or the motor vehicle door latch 10 has a depression 20 into which the swing-out tool 18 can be extended and retracted.

A view according to line V-V from FIG. 4 is reproduced in FIG. 5. The swing-out tool formed as a gripper finger 21 has a recess 22 which encompasses the locking bolt 6 at least in a form-fitting manner and at least in places. The motor vehicle lateral door 4, represented here as a dashed line, is situated in an opening position, so that a gap S results, into which an operator can reach and open the door completely. The opening position is thus illustrated. In a closure position, the motor vehicle door 4 would lie adjacent against the door seal 12 and no gap S would be present.

If the motor vehicle door 4 is now completely opened from the opening position illustrated in FIG. 5, the gripper finger 21 is thus able to move into the position illustrated in dotted lines. This can occur against a spring force inside the motor vehicle door latch or the swing-out device; however, the gripper finger 21 can also consist of a sprung material so that a sufficient adjacency pressure is present against the locking bolt that the motor vehicle door 4 is securely held in the opening position, but the operator can reach the motor vehicle door without great resistance. Furthermore, it is also conceivable that the gripper finger 21 is also magnetically executed in order to enable secure holding of the motor vehicle door in the opening position.

If the motor vehicle door 4 is situated in a closure position, the motor vehicle door 4 is thus adjacent to the door seal 12. If the motor vehicle door latch 10 is now electrically opened, the motor vehicle door 4 is thus moved by the door sealing pressure and moved into the opening position by means of the swing-out device 9. The swing-out tool 11, 15, 18 or the actuator 11, 15, 18 proceeds in a linear or near-linear manner and is magnetically attached to the latch holder bracket 6 and/or, similarly to a motor hood catch hook, as depicted in FIG. 5, for example, can be moved aside, the door is thus securely held in the opening position. After opening, in particular after complete opening of the motor vehicle door 4 the swing-out tool, in particular the actuator, plunger, suction cup and/or gripper finger can be retracted again. In an alternative embodiment it is conceivable to use the swing-out tool 11, 15, 18 for closure of the motor vehicle door 4 in order, for example, to absorb closure energy, which then in turn can be provided to move the motor vehicle door 4 from the closure position into the opening position.

LIST OF REFERENCE SYMBOLS

1 Motor vehicle
2 Motor vehicle front
3 Motor vehicle tailgate
4 Sides, motor vehicle lateral door
5 Motor vehicle chassis
6 Latch holder, locking bolt, latch holder bracket
7 Tailgate
8 Motor hood
9 Swing-out device
10 Motor vehicle door latch
11,15,18 Swing-out tool, actuator
12 Door seal
13 Fueling
14 Plunger
16 Conical tip
17 Key opening
19 Suction cup
20 Depression
21 Gripper finger
22 Recess
S Gap, opening gap

The invention claimed is:

1. A motor vehicle latch comprising:
a locking mechanism,
an electrical drive device for locking and unlocking the locking mechanism, and
a swing-out device, whereby a motor vehicle component incorporating the motor vehicle latch can be moved out of a closure position into an opening position by the swing-out device when the locking mechanism is unlocked, wherein the swing-out device holds the motor vehicle component in the opening position, so that independent opening of the motor vehicle component beyond the opening position can be prevented,
wherein the swing-out device has a swing-out tool, wherein the swing-out tool is configured to move the motor vehicle component into the opening position, and wherein the swing-out tool has a plunger which can be moved out of the motor vehicle latch.

2. The motor vehicle latch according to claim 1, wherein the swing-out device is integrated at least partly into the motor vehicle latch.

3. The motor vehicle latch according to claim 1, wherein the drive device forms a drive for the swing-out device.

4. The motor vehicle latch according to claim 1, wherein the swing-out tool interacts with one of a latch holder, a locking bolt, or a latch holder bracket.

5. The motor vehicle latch according to claim 1, wherein the swing-out tool interacts with a motor vehicle door seal.

6. The motor vehicle latch according to claim 4, wherein the swing-out tool interacts with the latch holder, in a form-fitting or force-fitting manner.

7. The motor vehicle latch according to claim 4, wherein the swing-out tool interacts with the latch holder by means of a magnetic force.

8. The motor vehicle latch according to claim 1, wherein the motor vehicle component is a motor vehicle door and the motor vehicle door can be brought into the opening position by the swing-out tool, whereby an opening gap (S) between the motor vehicle door and a motor vehicle chassis can be reached into.

9. The motor vehicle latch according to claim 1, wherein the swing-out tool is movable in the swing-out device whereby the swing-out tool is movable out of the motor vehicle component.

10. The motor vehicle latch according to claim 1, wherein the swing-out tool has a separate conical tip in addition to the plunger.

11. The motor vehicle latch according to claim 10, wherein both the plunger and the swing-out tool engage into a locking bolt in a form-fitting manner.

12. The motor vehicle latch according to claim 1, wherein the plunger acts directly on a locking bolt.

13. The motor vehicle latch according to claim 4, wherein the swing-out tool has a conical tip that engages into an opening of the locking bolt.

14. The motor vehicle latch according to claim 1, wherein the swing-out tool is formed of a plastic or spring steel material.

15. A motor vehicle latch comprising:
   a locking mechanism,
   an electrical drive device for locking and unlocking the locking mechanism, and
   a swing-out device, whereby a motor vehicle component incorporating the motor vehicle latch can be moved out of a closure position into an opening position by the swing-out device when the locking mechanism is unlocked, wherein the swing-out device holds the motor vehicle component in the opening position, so that independent opening of the motor vehicle component beyond the opening position can be prevented,
   wherein the swing-out device has a swing-out tool, wherein the swing-out tool is configured to move the motor vehicle component into the opening position, wherein the swing-out tool interacts with a latch holder by means of a magnetic force.

* * * * *